US011475125B2

(12) United States Patent
Sunkavally et al.

(10) Patent No.: US 11,475,125 B2
(45) Date of Patent: Oct. 18, 2022

(54) DISTRIBUTION-BASED AGGREGATION OF SCORES ACROSS MULTIPLE EVENTS

(71) Applicant: EMC IP Holding Company LLC, Hopkinton, MA (US)

(72) Inventors: Naveen Sunkavally, Cary, NC (US); Leandro E. Diato, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 174 days.

(21) Appl. No.: 16/400,655

(22) Filed: May 1, 2019

(65) Prior Publication Data
US 2020/0349255 A1 Nov. 5, 2020

(51) Int. Cl.
*G06F 21/00* (2013.01)
*H04L 29/06* (2006.01)
*G06F 21/55* (2013.01)
*G06F 21/57* (2013.01)
*G06F 17/18* (2006.01)
(Continued)

(52) U.S. Cl.
CPC .......... *G06F 21/552* (2013.01); *G06F 16/244* (2019.01); *G06F 17/18* (2013.01); *G06F 21/577* (2013.01); *G06Q 10/0635* (2013.01)

(58) Field of Classification Search
CPC ...... G06F 21/552; G06F 17/18; G06F 21/577; G06F 16/244; G06Q 10/0635
See application file for complete search history.

(56) References Cited

U.S. PATENT DOCUMENTS

2007/0031883 A1* 2/2007 Kincaid ................. G16B 25/00
 435/6.11
2012/0143650 A1* 6/2012 Crowley ................. H04L 41/28
 705/7.28

(Continued)

OTHER PUBLICATIONS

Wikipedia, Chi-Squared Test, https://en.wikipedia.org/wiki/Chi-squared_test, 2019.

(Continued)

*Primary Examiner* — Amie C. Lin
*Assistant Examiner* — Michael M Lee
(74) *Attorney, Agent, or Firm* — Ryan, Mason & Lewis, LLP

(57) ABSTRACT

Techniques are provided for distribution-based aggregation of scores across multiple events. One method comprises obtaining a plurality of individual scores associated with a plurality of events; obtaining an expected distribution for the plurality of individual scores; and generating an aggregate score for the plurality of individual scores based on a deviation of the plurality of individual scores from the obtained expected distribution for the plurality of individual scores. The aggregate score, for example, reflects how closely the individual scores follow the expected distribution. The aggregate score comprises, for example, an aggregate risk score that: (i) is compared across different vectors of an organization; (ii) is used to create a security policy and/or modify a security policy; and/or (iii) triggers an alert based on one or more predefined threshold criteria. The multiple aggregate risk scores can be visualized in one or more geographic regions and/or sub-networks of an organization.

20 Claims, 13 Drawing Sheets

| BUCKET | EXPECTED PERCENTILE DISTRIBUTION | WEIGHT |
|---|---|---|
| Z-SCORE < .01 | 1% | −1 |
| .01 <= Z-SCORE < .05 | 4% | −1 |
| .05 <= Z-SCORE < .1 | 5% | −1 |
| .1 <= Z-SCORE < .25 | 15% | −1 |
| .25 <= Z-SCORE < .5 | 25% | −1 |
| .5 <= Z-SCORE < .75 | 25% | +1 |
| .75 <= Z-SCORE <.9 | 15% | +1 |
| .9 <= Z-SCORE < .95 | 5% | +1 |
| .95 <= Z-SCORE < .99 | 4% | +1 |
| Z-SCORE >= .99 | 1% | +1 |

(51) Int. Cl.
*G06Q 10/06* (2012.01)
*G06F 16/242* (2019.01)

(56) References Cited

U.S. PATENT DOCUMENTS

| | | | | |
|---|---|---|---|---|
| 2015/0066575 | A1* | 3/2015 | Baikalov | G06Q 10/0635 705/7.28 |
| 2015/0161394 | A1* | 6/2015 | Ferragut | H04L 63/1425 726/25 |
| 2017/0070521 | A1* | 3/2017 | Bailey | G06F 21/32 |
| 2018/0219723 | A1* | 8/2018 | Scarpelli | H04L 41/069 |
| 2018/0322123 | A1* | 11/2018 | Cousins | G06F 16/29 |
| 2018/0324199 | A1* | 11/2018 | Crotinger | G06F 16/248 |
| 2018/0357422 | A1* | 12/2018 | Telang | G06F 21/577 |
| 2019/0319987 | A1* | 10/2019 | Levy | H04L 63/0838 |
| 2020/0076843 | A1* | 3/2020 | Luiggi | H04L 63/1425 |
| 2020/0120135 | A1* | 4/2020 | Hu | H04L 63/102 |
| 2020/0145447 | A1* | 5/2020 | Coffey | H04L 63/1425 |

OTHER PUBLICATIONS

Wikipedia, Kullback-Leibler Divergence, https://en.wikipedia.org/wiki/Kullback-Leibler_divergence, 2019.
Wikipedia, Standard Score, https://en.wikipedia.org/wiki/Standard_score, 2019.

\* cited by examiner

1) From $E$ and $B$, compute actual distribution of events $A$, where $A_i$ represents the percentage of events in $E$ that fall into bucket $B_i$;

2) Compute weighted sum of ratios between the actual values $A_i$ and the expected values $M_i$ (referred to as base_score):
   base_score = 0;
   for each bucket $B_i$:
   if $A_i > M_i$;
   base_score = base_score + $W_i * (A_i/M_i)$;

3) Normalize base_score by range between the minimum and maximum possible base_score (referred to as normalized_base_score):

$$normalized_{base\_score} = \frac{base\_score}{\max(base\_score) - \min(base\_score)};$$

4) intermediate_score is computed by applying a logistic function to normalized_base_score:

$$intermediate_{score} = logistic(normalized_{base\_score}, L, x_0, k);$$ and 5) final_score is computed by scaling intermediate_score into desired score range, using scaling factors $A$ and $B$:

$$final_{score} = A * intermediate_{score} + B.$$

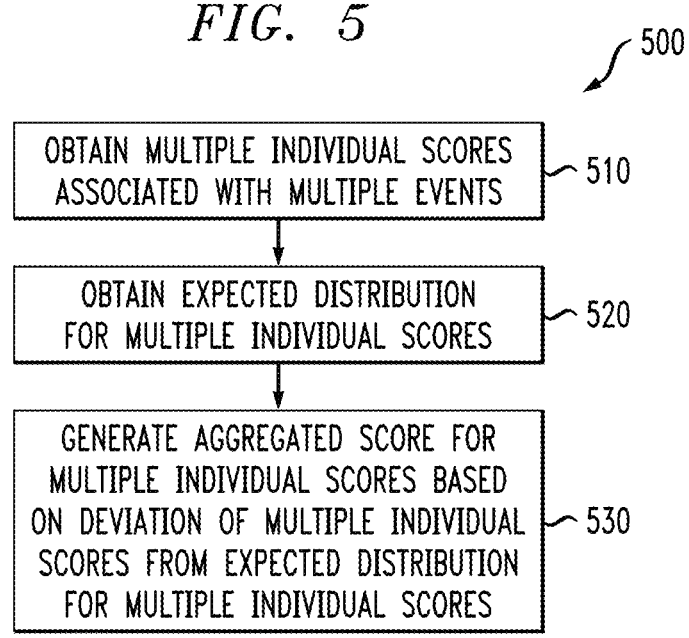

DISTRIBUTION-BASED AGGREGATION OF SCORES ACROSS MULTIPLE EVENTS

FIELD

The field relates generally to information processing systems, and more particularly to techniques for aggregating event scores in such systems.

BACKGROUND

User access events are often generated by an identity assurance system, such as the RSA SecurId Access™ identity assurance system, commercially available from Dell EMC of Hopkinton, Mass., each time an end user tries to access an application or another protected resource. A given user access event typically comprises metadata related to the access attempt including, for example, a user identifier, an identifier of the application or protected resource being accessed, an identifier of any policies that were applied, an identifier of the geolocation of the user at the time of the access, an identifier of the Internet Protocol (IP) address of the user, and an identifier of the device of the user. Each event is typically tagged with an "identity confidence" score representing a likelihood that the person accessing the protected resource is really the claimed user (typically, expressed as a continuous value). The identity confidence score can be considered as an inverse risk score (e.g., the higher the identity confidence score, the lower the risk of the access).

A need remains for improved techniques for aggregating scores for multiple events, such as aggregating individual risk scores for multiple security events.

SUMMARY

In one embodiment, a method comprises obtaining a plurality of individual scores associated with a plurality of events; obtaining an expected distribution for the plurality of individual scores; and generating an aggregate score for the plurality of individual scores based on a deviation of the plurality of individual scores from the obtained expected distribution for the plurality of individual scores. The aggregate score, for example, reflects how closely the individual scores follow the expected distribution.

In some embodiments, a range of possible values of the individual scores is partitioned into a set of non-overlapping buckets that cover the range of possible values, and each non-overlapping bucket optionally has (i) a corresponding expected percentile distribution indicating a percentage of the individual scores that should fall into each respective bucket; and (ii) a corresponding weight indicating how much a change in a given bucket contributes to an overall score, relative to other buckets, and/or whether the given bucket negatively or positively impacts the overall score.

In at least one embodiment, the aggregate score comprises an aggregate risk score that: (i) is compared across different vectors of an organization; (ii) is used to create a security policy and/or modify a security policy; and/or (iii) triggers an alert based on whether the aggregate risk score satisfies one or more predefined threshold criteria. The multiple aggregate risk scores are optionally visualized in one or more geographic regions and/or sub-networks of an organization.

Other illustrative embodiments include, without limitation, apparatus, systems, methods and computer program products comprising processor-readable storage media.

BRIEF DESCRIPTION OF THE DRAWINGS

FIG. 4 illustrates exemplary pseudo code for an aggregated risk score computation process, according to an embodiment of the disclosure;

FIG. 5 is a flow chart illustrating an exemplary implementation of a distribution-based risk score aggregation process, according to some embodiments of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for distribution-based aggregation of scores across multiple events. While one or more embodiments are illustrated in the context of aggregating multiple risk scores into an aggregate risk score, the disclosed score aggregation techniques apply to the aggregation of any metric or score across a set of events, as would be apparent to a person of ordinary skill in the art.

In one or more embodiments, techniques are provided for computing an aggregate score across substantially arbitrary groups of events, assuming that those events are themselves individually tagged with normalized scores. In some embodiments, aggregate risk scores generated in accordance with the present disclosure allow security administrators to gain a better visibility into the monitored environment and to better configure security policy.

Among other benefits, the disclosed score aggregation techniques allow the aggregated score to be dynamically computed (e.g., on the fly) using existing database and/or indexing technologies. In addition, prior knowledge of how events are grouped is not required in some embodiments. Furthermore, the disclosed aggregate score is more powerful than conventional summary statistics such as a maximum, minimum, mean or median because the disclosed aggregated score considers how the scores are expected to be distributed, and the disclosed aggregate score can be adjusted in some embodiments to reflect how end users perceive risk, for example.

One or more aspects of the disclosure recognize that scores, such as identity confidence scores, often follow an expected distribution, such as a Bell Curve distribution. Generally, under normal circumstances (e.g., with no anomalies or significant increases in malicious events observed), identity confidence scores can be modeled, for example, based on a Bell Curve (Gaussian) distribution with a zero mean and a unit variance. It is possible and considered normal to have both very low confidence events and very high confidence events, but the distribution of these event scores should follow a Bell Curve pattern.

In one or more embodiments, the disclosed score aggregation techniques derive an aggregate score that reflects how closely an arbitrary set of event scores in a group follows an expected distribution, such as a Bell Curve distribution.

Figure 1:
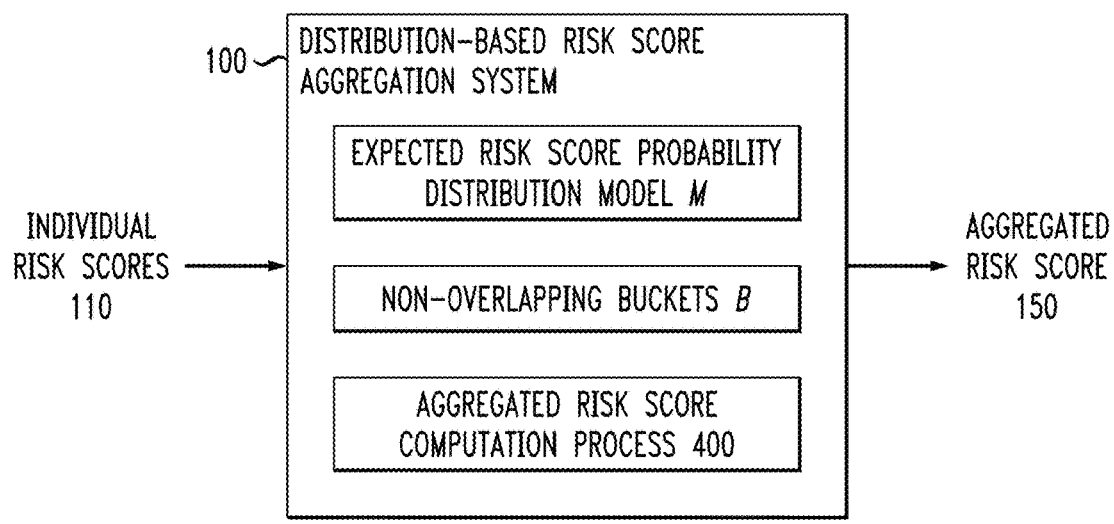
FIG. 1 illustrates a distribution-based risk score aggregation system, according to an embodiment of the disclosure.

FIG. 1 illustrates a distribution-based risk score aggregation system 100, according to an embodiment of the disclosure. As shown in FIG. 1, in the exemplary embodiment, a set of individual risk scores 110 for a collection of security events are applied to the distribution-based risk score aggregation system 100. The applied individual risk scores 110 may be discrete or continuous. The exemplary distribution-based risk score aggregation system 100 employs an expected risk score probability distribution model M representing an expected probability distribution of risk scores across multiple security events under normal circumstances (e.g., when a system is in steady-state with no major anomalies present). While an exemplary Bell curve is employed in one or more exemplary embodiments, the expected risk score probability distribution model M employed by the distribution-based risk score aggregation system 100 can employ any distribution, as would be apparent to a person of ordinary skill in the art. There are many statistical techniques available for modeling distributions. In the case of the exemplary SecurId Access™ identity assurance system, the individual risk scores 110 can be modeled as following a Bell Curve (normal) distribution, as discussed further below in conjunction with FIG. 2.

The distribution-based risk score aggregation system 100 generates an aggregated risk score 150, representing the set of individual risk scores 110. In some embodiments, the exemplary aggregated risk score 150 considers how much the set of individual risk scores 110 deviate from the known distribution associated with the Expected risk score probability distribution model M.

While one or more embodiments are illustrated using user access events associated with the RSA SecurId Access™ identity assurance system, the disclosed risk score aggregation techniques can be employed to aggregate any risk scores, as would be apparent to a person of ordinary skill in the art.

Figure 2:
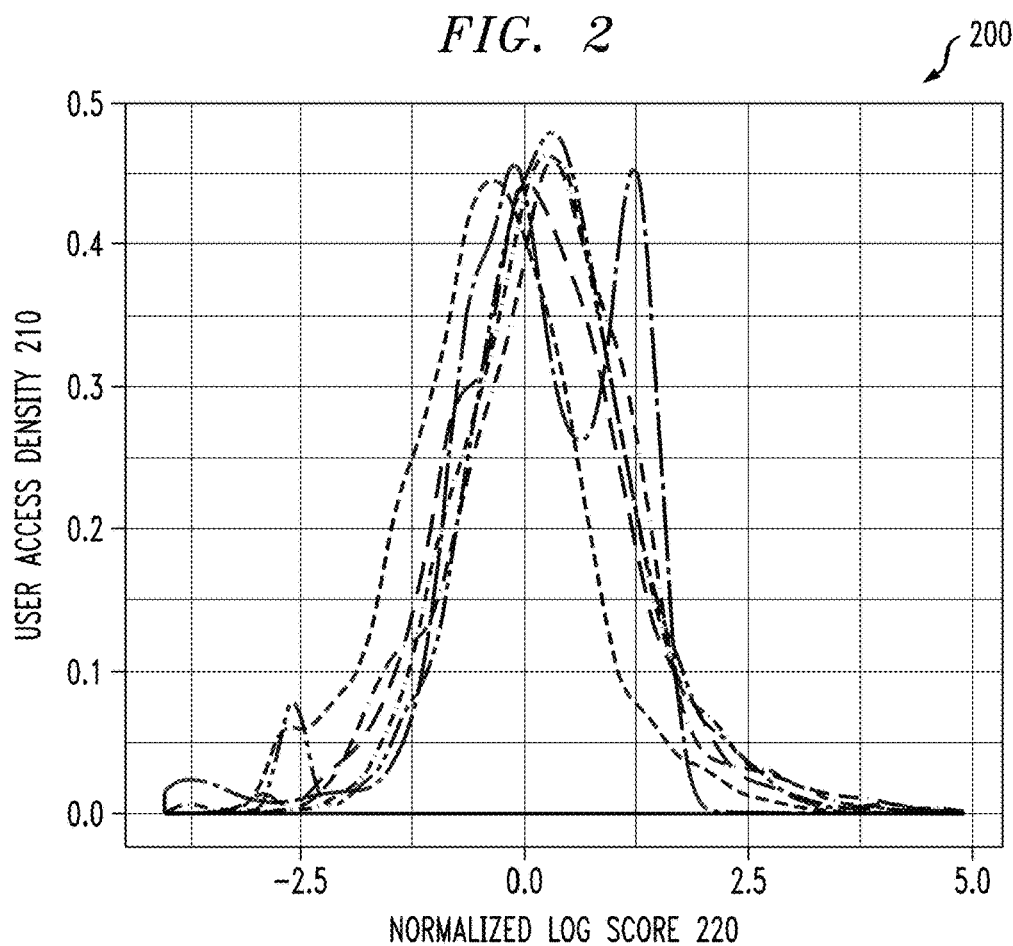
FIG. 2 illustrates the individual risk score values of FIG. 1 modeled as an exemplary threshold-normalized log score distribution over time, based on an exemplary Bell Curve distribution, according to some embodiments.

FIG. 2 illustrates the individual risk scores 110 of FIG. 1 modeled as an exemplary threshold-normalized log score distribution 200 over time, based on an exemplary Bell Curve (normal) distribution, according to some embodiments. The exemplary distribution 200 is separately generated for the individual risk scores 110 for each same day of the month (e.g., the second day of each month), for six consecutive exemplary months. In the example of FIG. 2, a user access density 210 is represented as a function of the normalized log score 220.

In addition, in some embodiments, the range of possible risk scores for the individual risk scores 110 are partitioned into a set of non-overlapping buckets B that cover the full range of possible risk score values. |B| represents the total number of buckets, and each bucket $B_i$ has a range covering values that fall into that bucket.

In one exemplary implementation, the exemplary individual risk scores 110 are based on identity confidence scores generated by the exemplary SecurId Access™ identity assurance system. The exemplary individual risk scores 110 are partitioned into the following 10 buckets B (e.g., |B|=10), in some embodiments, based on the well-known standard score (often referred to as a z-score) of the identity confidence score, as discussed further below in conjunction with FIG. 3:

$B_1$: z-score<0.01;
$B_2$: 0.01<=z-score<0.05;
$B_3$: 0.05<=z-score<0.1;
$B_4$: 0.1<=z-score<0.25;
$B_5$: 0.25<=z-score<0.5;
$B_6$: 0.5<=z-score<0.75;
$B_7$: 0.75<=z-score<0.9;
$B_8$: 0.9<=z-score<0.95;
$B_9$: 0.95<=z-score<0.99; and
$B_{10}$: z-score>=0.99.

For a more detailed discussion of standard scores, see, for example, the "Standard Score" page on Wikipedia, incorporated by reference herein in its entirety.

Figure 3:
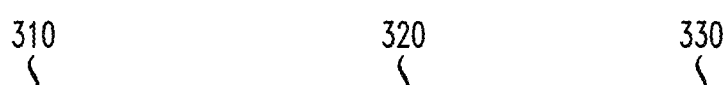
FIG. 3 is a sample table indicating an exemplary set of buckets, as well as a corresponding expected percentile distribution and weight for each bucket, according to at least one embodiment of the disclosure.

FIG. 3 is a sample table 300 indicating an exemplary set of buckets 310 (where |B|=10), as well as a corresponding expected percentile distribution 320 and weight 330 for each bucket, $B_i$, according to at least one embodiment. The expected percentile distribution 320 and weights 330 shown in FIG. 3 are merely an example assignment of percentile distributions and weights, respectively.

Based on the buckets, B, the model M is used to predict the percentage of events (e.g., the expected percentile distribution 320) that should fall into each bucket. $M_i$ is the expected percentage of events that should fall into a given bucket $B_i$.

Additionally, a weight ($W_i$) 330 is optionally assigned to each bucket, $B_i$. Generally, a weight $W_i$ is any real number, negative or positive. An exemplary weight reflects two things: 1) how much a change in a bucket contributes to the overall risk score, relative to other buckets, and 2) whether the bucket negatively or positively impacts the risk score.

A different assignment of percentile distributions 320 and/or weights 330 than those shown in FIG. 3 can be employed in alternate embodiments, as would be apparent to a person of ordinary skill in the art.

FIG. 4 illustrates exemplary pseudo code for an aggregated risk score computation process 400, according to one embodiment of the disclosure. As shown in FIG. 4, for an arbitrary set of actual events E, an aggregated risk score 150 (FIG. 1) is computed for E, given the model M, buckets B, and weights W, as follows:

1) From E and B, compute the actual distribution of events A, where $A_i$ represents the percentage of events in E that fall into bucket $B_i$;

2) Compute a weighted sum of ratios between the actual values $A_i$ and the expected values $M_i$. To avoid double-penalizing, only the difference in cases where the actual percentage $A_i$ exceeds the expected percentage $M_i$ are considered. The weighted sum is referred to as the base_score:

base_score=0;
for each bucket $B_i$:
if $A_i > M_i$:

$$\text{base\_score} = \text{base\_score} + W_i \ast (A_i / M_i).$$

3) Normalize the base_score by the range between the substantially minimum and maximum possible base_score. The substantially minimum and maximum base score can be readily pre-computed using worst-case and best-case inputs, respectively. The normalized score is referred to as the normalized_base_score:

$$\text{normalized\_base\_score} = \frac{\text{base\_score}}{\max(\text{base\_score}) - \min(\text{base\_score})}.$$

4) An intermediate_score is computed by applying a logistic function to the normalized_base_score. This standard logistic function is widely used in machine learning and has a property of mapping scores to a range (0, 1) and pushing scores away from the middle towards the boundary to accentuate differences in low and high scores. Constants L, $x_0$ and k (as described on the Wikipedia page for logistic functions) are tunable pre-configured parameters to the logistic function. These parameters can be tuned to control the degree that outliers are accentuated. In the case of the exemplary SecurId™ identity confidence scores, L was set to 16, k was set to 1, and $x_0$ was set to 0:

intermediate_score=logistic(normalized_base_score, $L,x_0,k$).

5) The final_score is computed by scaling the intermediate score into the desired score range, using scaling factors A and B. In the case of the exemplary SecurId™ confidence scores, A was set to 100 and B was set to 0, to produce a score between 0 and 100, as follows:

$\text{final}_{score}=A^*\text{intermediate}_{score}+B.$

FIG. 5 is a flow chart illustrating an exemplary implementation of a distribution-based score aggregation process 500, according to one embodiment of the disclosure. As shown in FIG. 5, the exemplary distribution-based score aggregation process 500 initially obtains multiple individual scores (e.g., risk scores) associated with multiple events (e.g., security events) during step 510. Thereafter, an expected distribution for the multiple individual scores is obtained during step 520.

Finally, the exemplary distribution-based score aggregation process 500 generates an aggregated score, such as an aggregate risk score, for the multiple individual scores during step 530 based on a deviation of the multiple individual scores from the expected distribution for the multiple individual scores.

Figure 6:
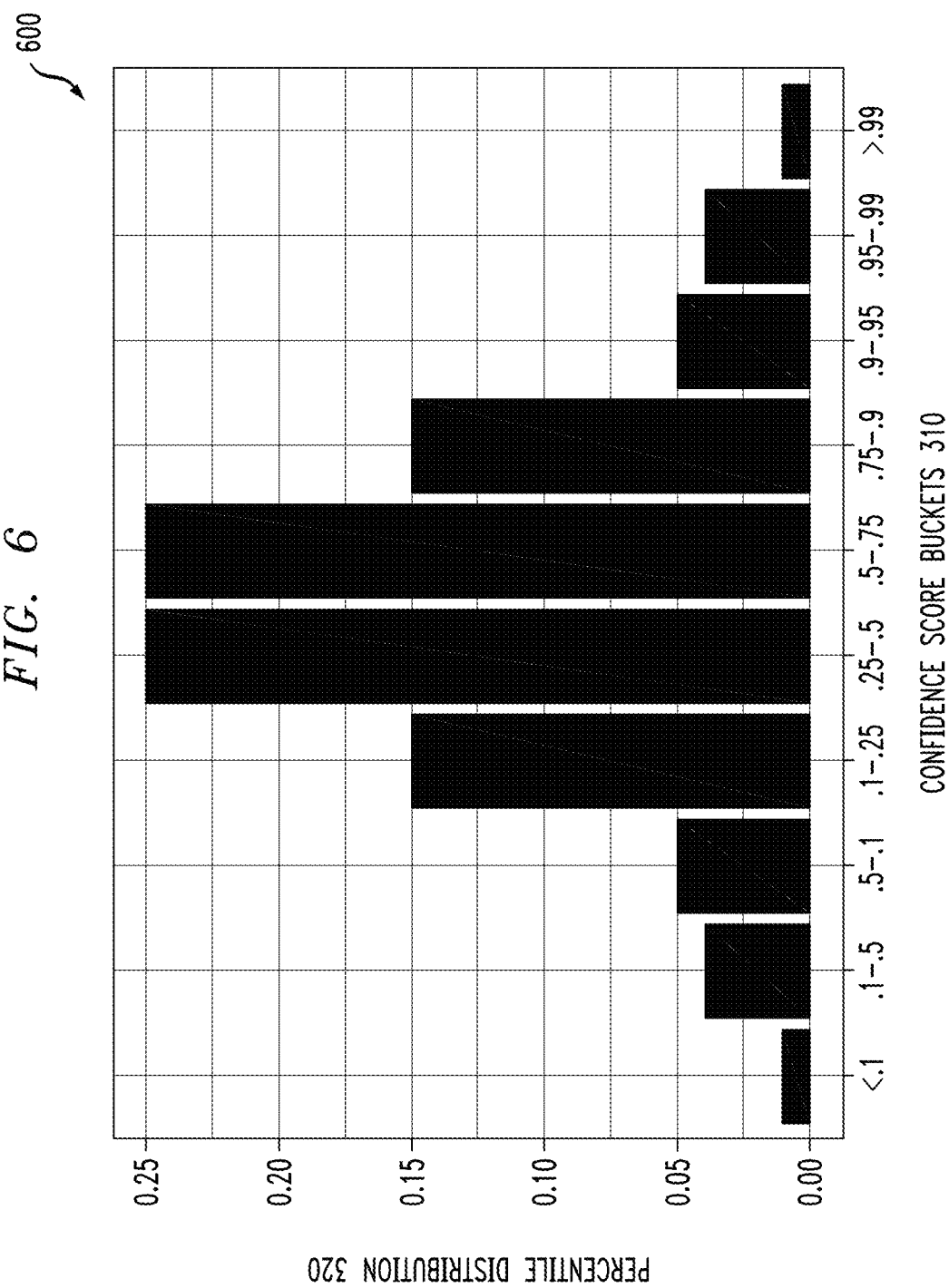
FIGS. 6 through 11 illustrate various expected distributions based on the expected percentile distributions set forth in FIG. 3 for each bucket, according to one or more embodiments.

FIG. 6 illustrates an expected distribution 600 based on the expected percentile distributions 320 set forth in FIG. 3 for each bucket 310. In the example of FIG. 6, the percentile distributions 320 are represented as a function of the confidence score buckets 310. Scores range from 0 to 100 and a score of 50 is generated in some embodiments when the actual distribution of risk scores matches the expected distribution, or when the actual distribution is symmetric. The scores intuitively match what one would expect.

Figure 7:
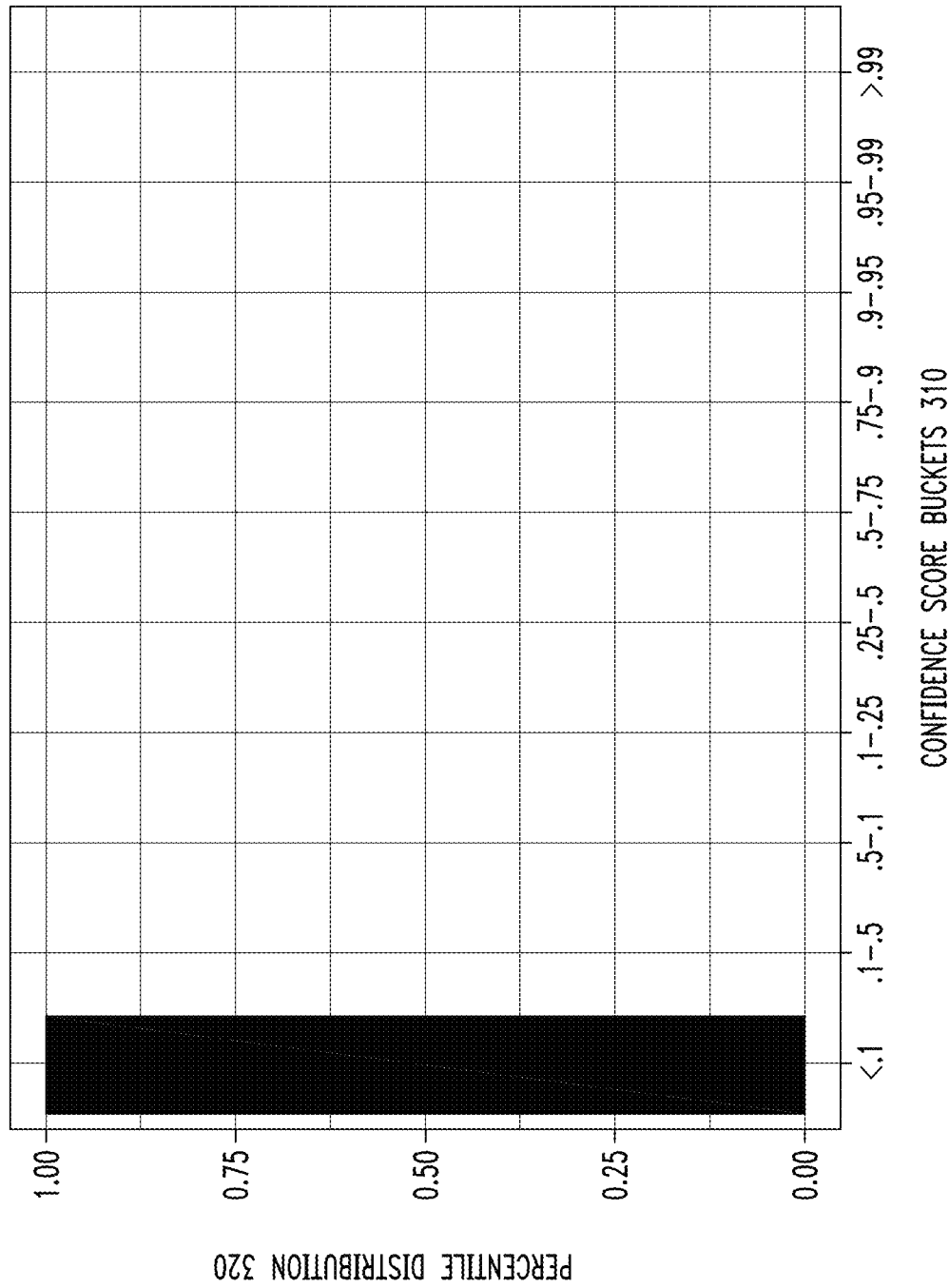

FIG. 7 illustrates an exemplary confidence distribution 700 based on the expected percentile distributions 320 set forth in FIG. 3 for each bucket 310, corresponding to a very low confidence distribution, where all events that fall into the bucket have a score below 0.01, and have an aggregate score of 0.03353, which is very close to 0.

Figure 8:
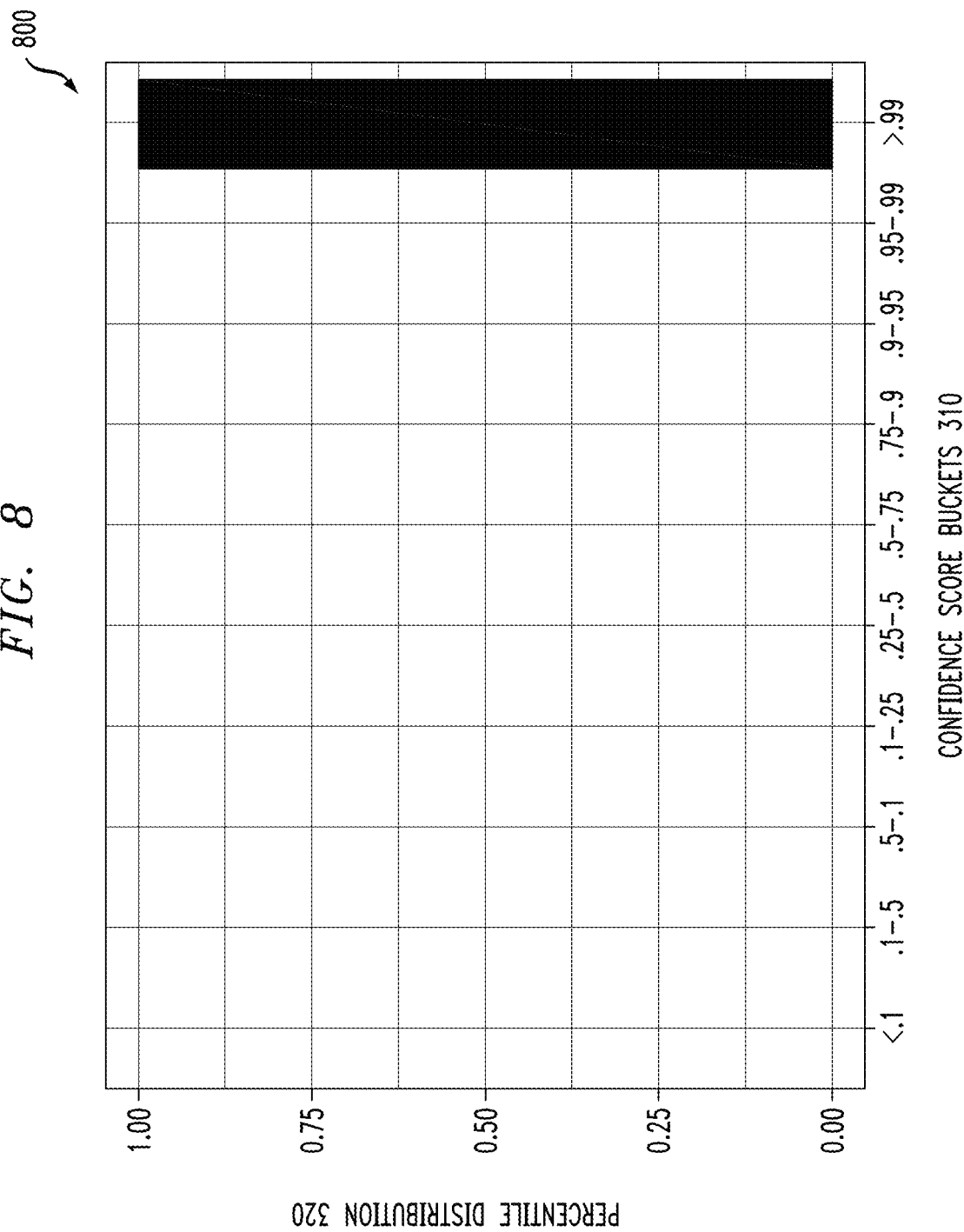

FIG. 8, on the other hand, illustrates an exemplary confidence distribution 800 based on the expected percentile distributions 320 set forth in FIG. 3 for each bucket 310, corresponding to a very high confidence distribution, where all events fall into the bucket with scores greater than or equal to 0.99, and having an aggregate score of 99.966, which is very close to 100.

Figure 9:
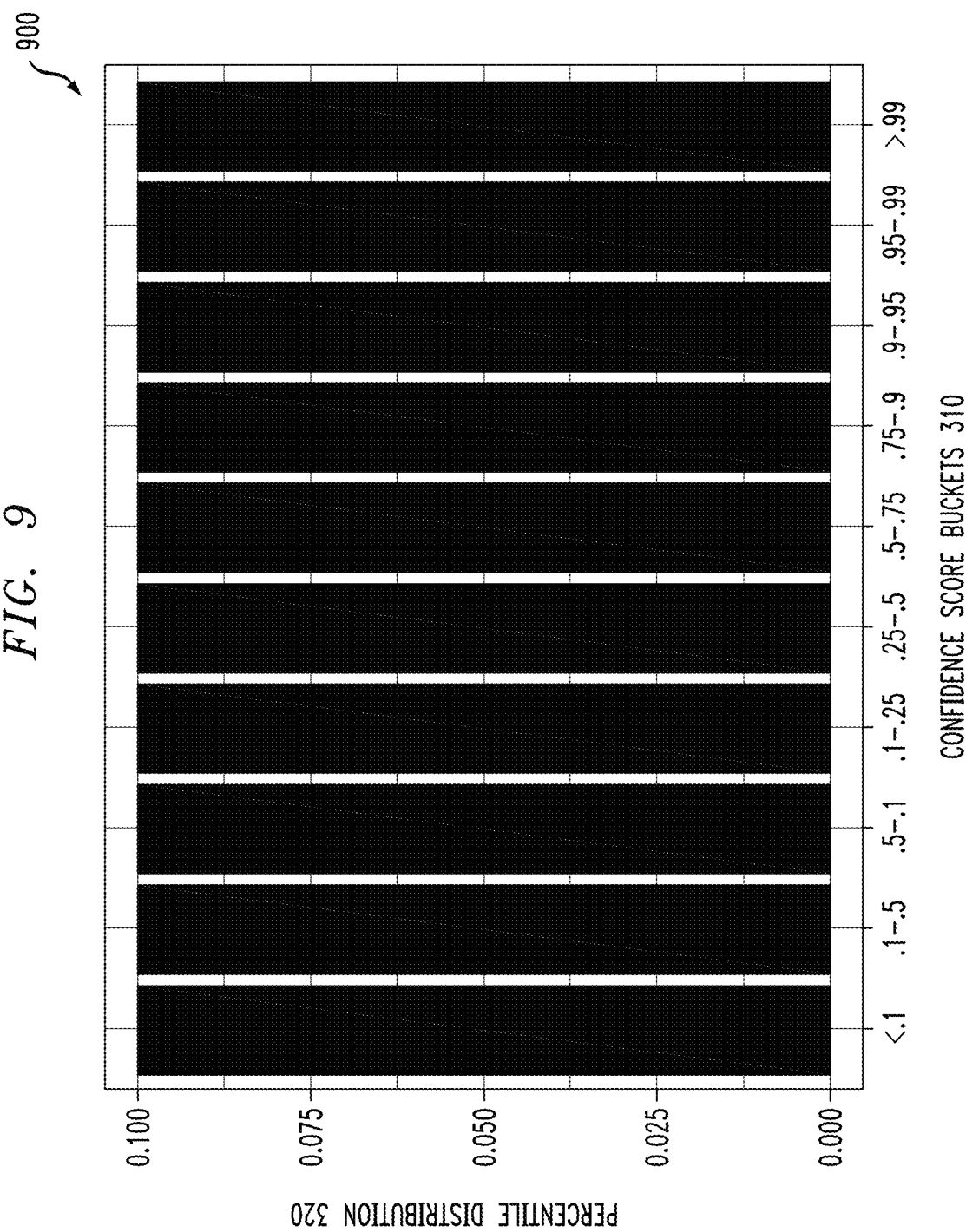

FIG. 9 illustrates an exemplary confidence distribution 900 based on the expected percentile distributions 320 set forth in FIG. 3 for each bucket 310, corresponding to a representative symmetric sample percentile distribution, where the uniform distribution has a corresponding aggregate score of 50. This is expected because the difference in weights in any given bucket is negated by a difference in weight in another bucket.

Figure 10:
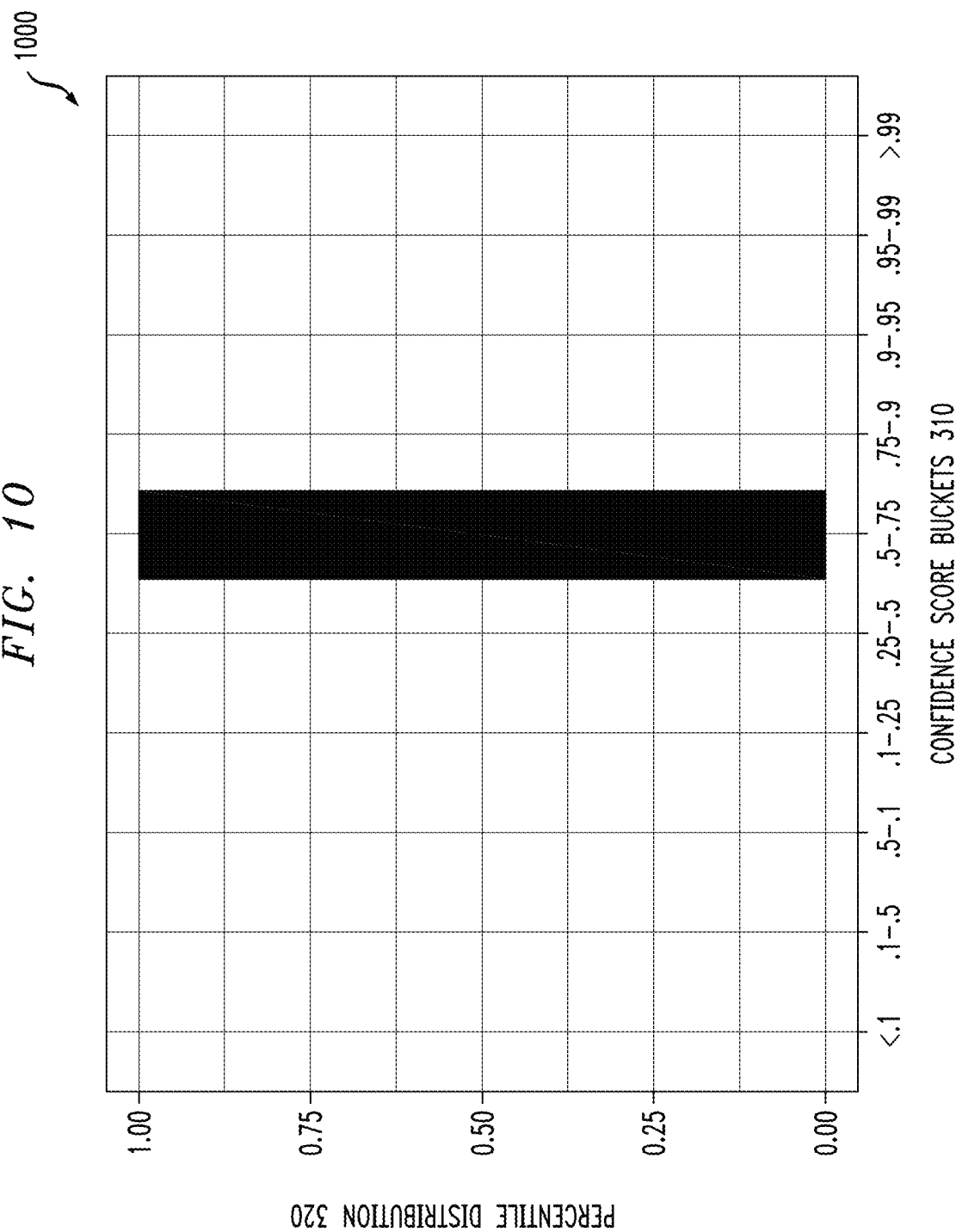

FIG. 10 illustrates an exemplary confidence distribution 1000 based on the expected percentile distributions 320 set forth in FIG. 3 for each bucket 310, corresponding to a representative distribution having an aggregate score just above 50 (57.93), since the distribution is just above the middle bucket.

Figure 11:
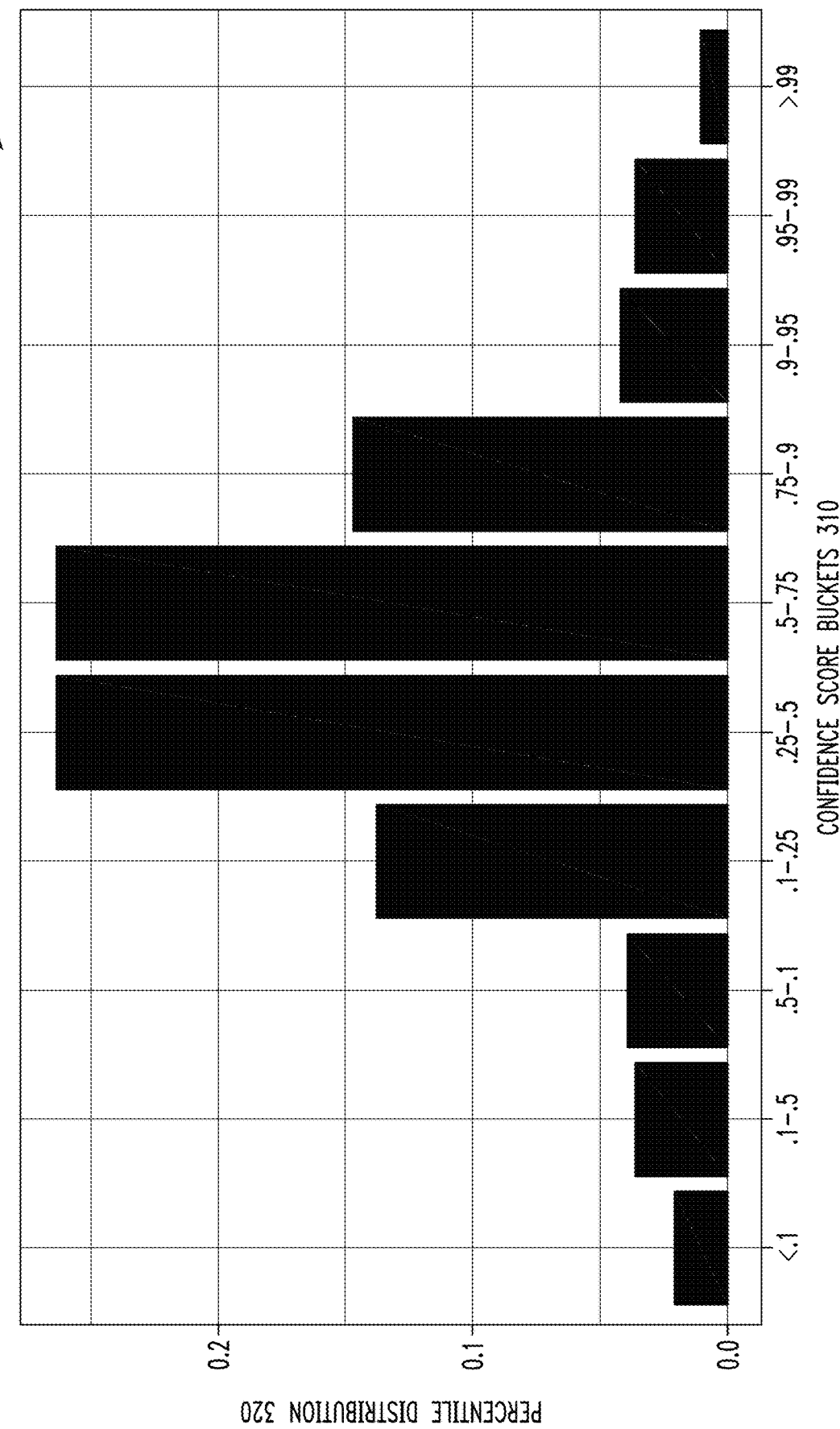

FIG. 11 illustrates an exemplary confidence distribution 1100 based on the expected percentile distributions 320 set forth in FIG. 3 for each bucket 310, corresponding to a representative distribution having an aggregate score just below 50 (47.89), since the first bucket is pulling the overall aggregate score towards a lower confidence value.

One or more aspects of the disclosure recognize that the disclosed aggregate risk scores are useful for a number and variety of purposes, including, for example:

Visibility—to help security administrators see risk scores and be able to compare risk scores across different vectors or facets of an enterprise (in the exemplary case of the SecurId™ identity assurance system, for example, these vectors or facets include Active Directory groups, subnets, geo-regions, and applications);

Policy Configuration—for example, in the exemplary case of the SecurId™ identity assurance system, aggregate identity confidence scores help to identify subnets or locations that are candidates for whitelisting or blacklisting access from, or requiring lower or higher identity assurance levels;

Using Aggregate Scores Directly inside a Policy—aggregate risk scores can be computed dynamically at the time of policy evaluation (for example, suppose there is a rule stating that, if the aggregate identity confidence score for a specific location is below 20, then deny access; if the aggregate identity confidence score is between 20 and 75, require step-up; otherwise, allow access without step-up); and Alerting/Recommendations—for example, in the exemplary case of the SecurId™ identity assurance system, alerts can be set to trigger if the aggregate identity confidence score falls below a certain threshold for any geo-regions that correspond to major company facilities.

In some embodiments, one or more remedial actions are performed, for example, on a file or another protected resource, such as isolating the input file or other protected resource, removing the input file or other protected resource, applying a quarantine on the input file or other protected resource, limiting the permissions associated with the input file or other protected resource, analyzing the file in a sandbox environment and deleting the input file.

In further embodiments, the aggregate scores can be used in the realm of performance monitoring and management. For example, suppose there are end-users accessing a web application in the cloud, and the web application comprises many different web servers on the backend. Performance metrics can be captured, such as request latency (e.g., time for the user to obtain a response from the web application) and mapped to an expected distribution. Aggregate scores can be computed as described herein and compared across different criteria, such as user location, web server location, and browser type, among others. In this manner, the concept of latency is similar to the idea of a risk score.

In an exemplary Internet of Things (IoT) implementation, there are numbers IoT devices emitting performance measurements, and those performance measurements can be modeled as following a certain expected distribution. Then, using the disclosed aggregation techniques, an actual distribution of measurements can be obtained and compared to the expected distribution to compute an aggregate score. The aggregate score can be compared across different criteria, such as device geolocation and/or facility, device type and/or model, and time of day.

Figure 12:
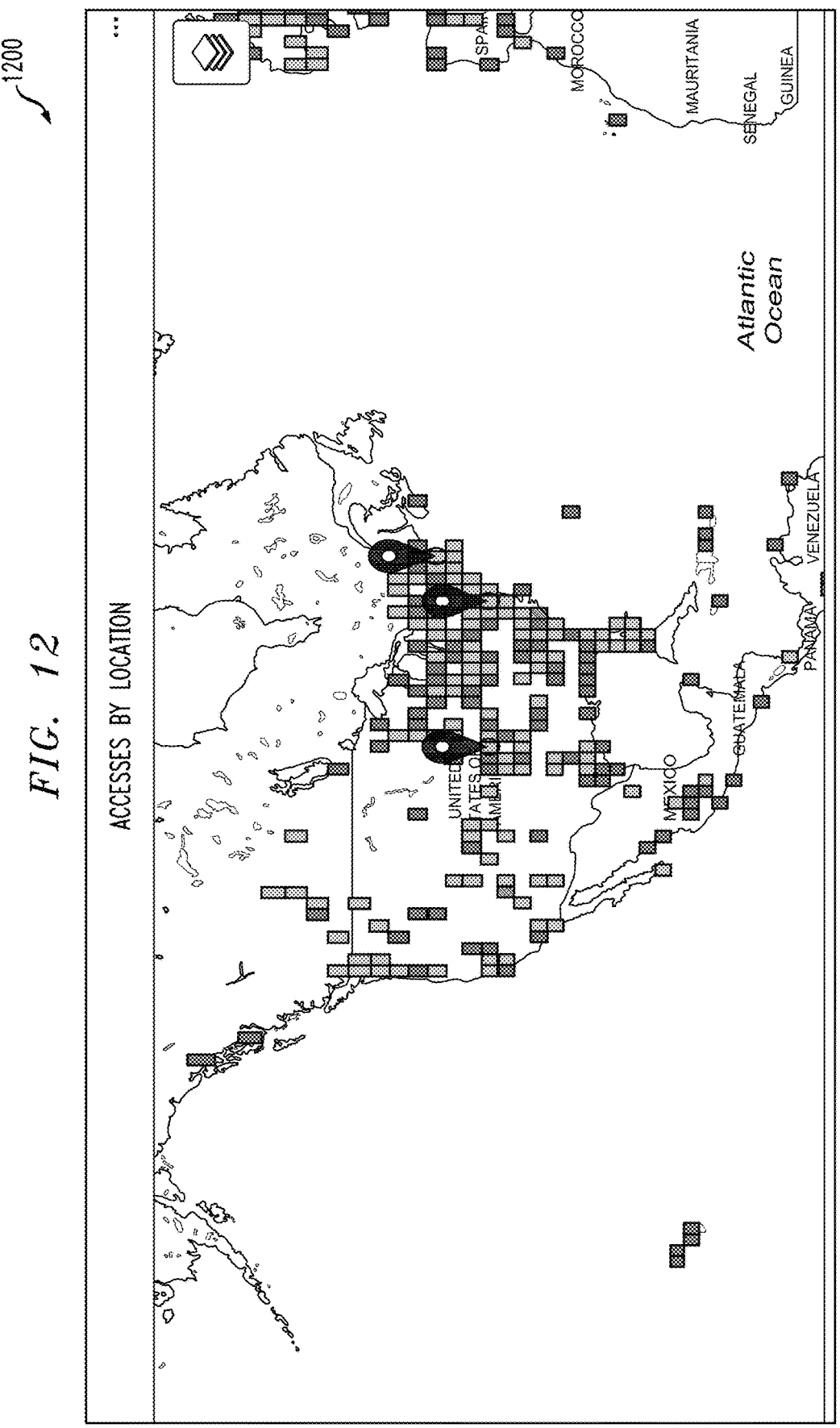
FIGS. 12 and 13 illustrate exemplary interfaces that visualize aggregate risk scores across various aspects of an organization, according to at least one embodiment of the disclosure.

When there are performance deviations among different sectors of an enterprise, different remedial actions can be performed based on predefined policy and/or rules. For example, for a latency variation, for example, resources (e.g., computing, memory, storage, input/output (I/O) and/or network resources) can be reallocated to an underperforming sector from other sectors and/or new resources can be obtained for an underperforming sector (for example, a new server or other equipment can be obtained and positioned closed to an underperforming geo-location). Likewise, for an underperforming browser type, a different (e.g., stripped down) version of the web site could be presented automatically to users to improve latency. Additional remedial actions would be apparent to a person of ordinary skill in the art, based on the examples and disclosure provided herein FIG. 12 illustrates a map-based interface 1200 that visualizes aggregate risk scores in one or more geographic regions, according to an embodiment of the disclosure. In some embodiments, the map-based interface 1200 can be used to color-code regions based on a corresponding risk level indicated by the corresponding aggregate risk score.

Figure 13:
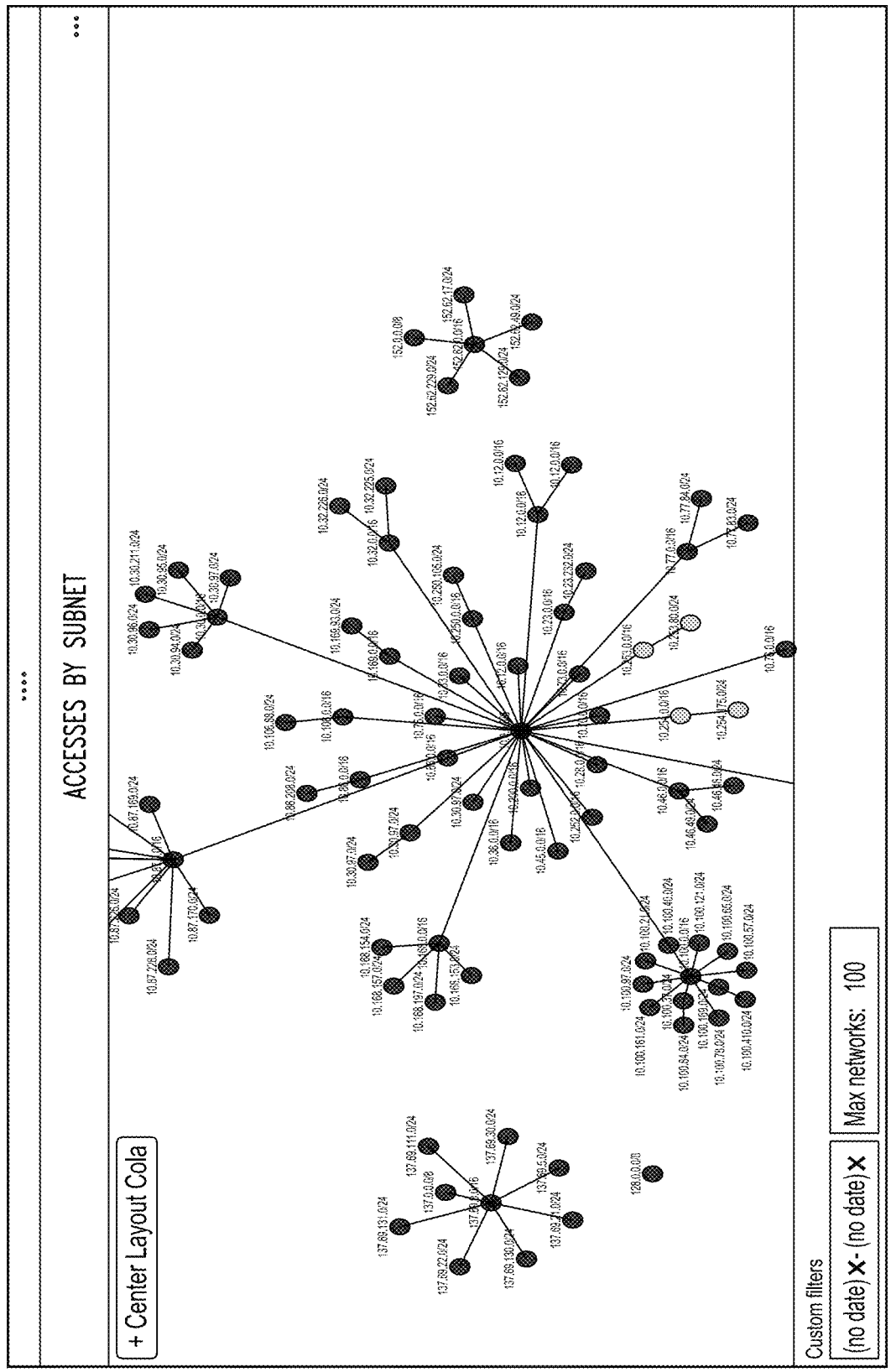

FIG. 13 illustrates a network-based interface 1300 that visualizes aggregate risk scores in one or more subnets of an enterprise, according to at least one embodiment of the disclosure. In some embodiments, the network-based interface 1300 can be used to color-code subnet nodes based on a corresponding risk level indicated by the corresponding aggregate risk score.

As discussed above, in one or more embodiments, the following inputs to the aggregate risk score computation are customizable: the model M, the number and ranges for buckets B, the weights W, parameters L, k, and $x_0$ for the logistic function, and parameters A and B for the final score, as would be apparent to a person of ordinary skill in the art.

Conventional aggregate scores, such as the mean, sum, or median risk score, tend to be simplistic and generally do not capture how the risk, for example, relates to an expected risk distribution. These statistics perform poorly when the expected risk distribution is skewed, and they are not tunable.

In one or more embodiments, techniques are provided for computing an aggregate score across substantially arbitrary groups of events, such as security events. In some embodiments, the aggregate risk scores allow security administrators to gain a better visibility into the monitored environment and to better configure security policy.

Among other benefits, the disclosed score aggregation techniques allow the aggregated risk score to be dynamically computed (e.g., on the fly) using existing database and/or indexing technologies. In addition, prior knowledge of how events are grouped is not required in some embodiments. Furthermore, the disclosed aggregated score is more powerful than conventional summary statistics such as a maximum, minimum, mean or median because the disclosed aggregated score considers how the scores are expected to be distributed, and the disclosed aggregated risk score, for example, can be adjusted in some embodiments to reflect how end users perceive risk.

In some embodiments, the disclosed score aggregation techniques allow the aggregated score to be tuned in order to control how much outlier values should be factored into the overall score. In addition, the disclosed score aggregation techniques capture the deviation from an expected distribution.

One or more embodiments of the disclosure provide improved methods, apparatus and computer program products for distribution-based aggregation of scores across multiple events. The foregoing applications and associated embodiments should be considered as illustrative only, and numerous other embodiments can be configured using the techniques disclosed herein, in a wide variety of different applications.

It should also be understood that the disclosed score aggregation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for distribution-based aggregation of scores across multiple events may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based score aggregation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based score aggregation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 14 and 15. These platforms may also be used to implement at least portions of other information processing systems in other embodiments.

Figure 14:
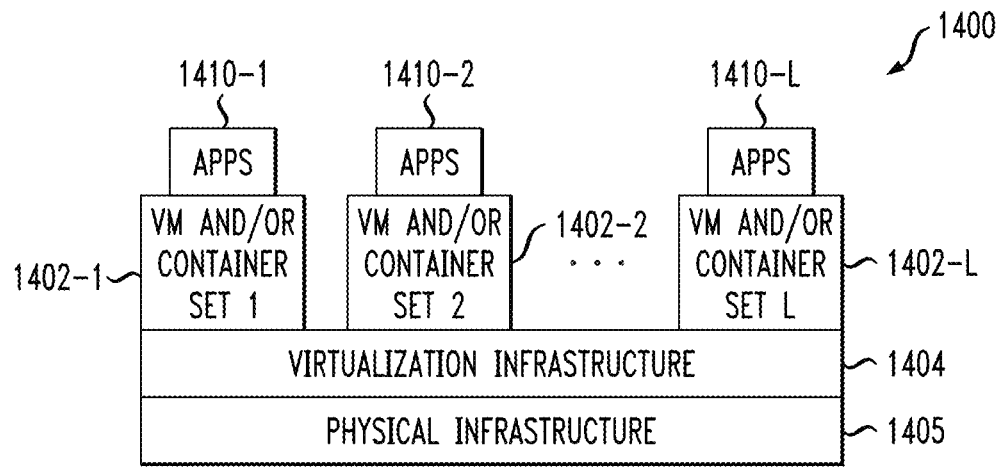
FIG. 14 illustrates an exemplary processing platform that may be used to implement at least a portion of one or more embodiments of the disclosure comprising a cloud infrastructure.

FIG. 14 shows an example processing platform comprising cloud infrastructure 1400. The cloud infrastructure 1400 comprises a combination of physical and virtual processing resources that may be utilized to implement at least a portion of an information processing system. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. Such implementations can provide score aggregation functionality of the type described above for one or more processes running on a given one of the VMs. For example, each of the VMs can implement score aggregation control logic for generating aggregate scores for one or more processes running on that particular VM.

An example of a hypervisor platform that may be used to implement a hypervisor within the virtualization infrastructure 1404 is the VMware® vSphere® which may have an associated virtual infrastructure management system such as the VMware® vCenter™. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system. Such implementations can provide score aggregation functionality of the type described above for one or more processes running on different ones of the containers. For example, a container host device supporting multiple containers of one or more container sets can implement one or more instances of score aggregation control logic for use in generating aggregate scores.

As is apparent from the above, one or more of the processing modules or other components of distribution-based risk score aggregation system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises at least a portion of the given system and includes a plurality of processing devices, denoted 1502-1, 1502-2, 1502-3, . . . 1502-K, which communicate with one another over a network 1504. The network 1504 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1502-1 in the processing platform 1500 comprises a processor 1510 coupled to a memory 1512. The processor 1510 may comprise a microprocessor, a microcontroller, an application specific integrated circuit (ASIC), a field programmable gate array (FPGA) or other type of processing circuitry, as well as portions or combinations of such circuitry elements, and the memory 1512, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and the given system may include additional or alternative processing platforms, as well as numerous distinct processing platforms in any combination, with each such platform comprising one or more computers, storage devices or other processing devices.

Figure 15:
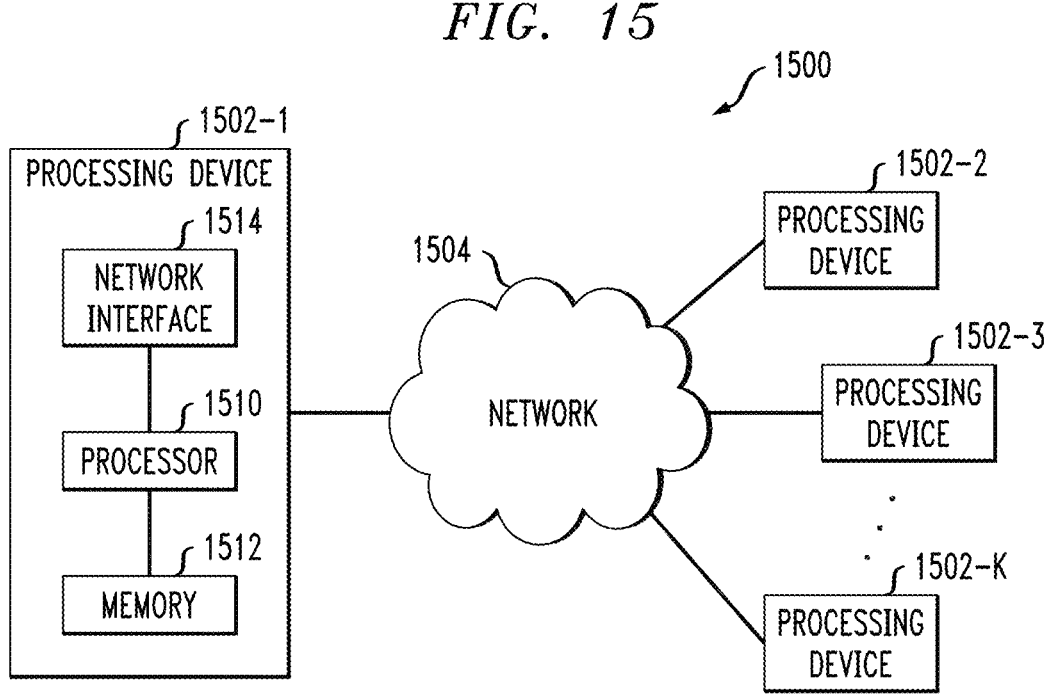
FIG. 15 illustrates another exemplary processing platform that may be used to implement at least a portion of one or more embodiments of the disclosure.

Multiple elements of an information processing system may be collectively implemented on a common processing platform of the type shown in FIG. 14 or 15, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other components of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining a plurality of individual scores each indicating a likelihood of an anomaly associated with a corresponding one of a plurality of distinct security events, wherein a given individual score comprises one or more of: a confidence score and a risk score;
   obtaining an expected distribution for the plurality of individual scores, over a range of score values, across the plurality of distinct security events, wherein the range of score values is partitioned into a plurality of buckets;
   generating, using at least one processing device, an aggregate score that represents the plurality of individual scores, wherein the aggregate score is based at least in part on an aggregation of a ratio, for two or more of the plurality of buckets, of: (i) a count or a percentage of the plurality of individual scores within a given portion of the range, relative to (ii) an expected count or an expected percentage of the plurality of individual scores within the corresponding given portion of the range based on the obtained expected distribution for the plurality of individual scores, wherein the aggregate score provides an indication of a deviation of the plurality of individual scores from the expected distribution; and
   initiating one or more automated remedial actions based at least in part on the aggregate score.

2. The method of claim 1, wherein the plurality of buckets comprises a set of non-overlapping buckets that cover the range of score values.

3. The method of claim 2, wherein each of the non-overlapping buckets has a corresponding expected percentile distribution indicating a percentage of the plurality of individual scores that should fall into each respective bucket.

4. The method of claim 2, wherein each of the non-overlapping buckets has a corresponding weight indicating one or more of how much a change in a given bucket contributes to an overall score, relative to other buckets, and whether the given bucket negatively or positively impacts the overall score.

5. The method of claim 1, wherein the generating the aggregate score that represents the plurality of individual scores further comprises computing an actual distribution of the plurality of individual scores.

6. The method of claim 1, further comprising comparing multiple aggregate risk scores across different vectors of an organization.

7. The method of claim 1, wherein the one or more remedial actions comprise one or more of: (i) creating a security policy and (ii) modifying the security policy.

8. The method of claim 1, wherein an aggregate risk score is dynamically generated when one or more security policies are evaluated.

9. The method of claim 1, further comprising triggering an alert based on whether an aggregate risk score satisfies one or more predefined threshold criteria.

10. The method of claim 1, further comprising visualizing multiple aggregate risk scores in one or more of geographic regions and sub-networks of an organization.

11. A computer program product, comprising a non-transitory machine-readable storage medium having encoded therein executable code of one or more software programs, wherein the one or more software programs when executed by at least one processing device perform the following steps:
   obtaining a plurality of individual scores each indicating a likelihood of an anomaly associated with a corresponding one of a plurality of distinct security events, wherein a given individual score comprises one or more of: a confidence score and a risk score;

obtaining an expected distribution for the plurality of individual scores, over a range of score values, across the plurality of distinct security events, wherein the range of score values is partitioned into a plurality of buckets;

generating, using at least one processing device, an aggregate score that represents the plurality of individual scores, wherein the aggregate score is based at least in part on an aggregation of a ratio, for two or more of the plurality of buckets, of: (i) a count or a percentage of the plurality of individual scores within a given portion of the range, relative to (ii) an expected count or an expected percentage of the plurality of individual scores within the corresponding given portion of the range based on the obtained expected distribution for the plurality of individual scores, wherein the aggregate score provides an indication of a deviation of the plurality of individual scores from the expected distribution; and initiating one or more automated remedial actions based at least in part on the aggregate score.

12. The computer program product of claim 11, wherein the plurality of buckets comprises a set of non-overlapping buckets that cover the range of score values, and wherein each of the non-overlapping buckets has a corresponding expected percentile distribution indicating a percentage of the plurality of individual scores that should fall into each respective bucket.

13. The computer program product of claim 11, wherein the aggregate score comprises an aggregate risk score for a plurality of security events, and further comprising one or more steps of: (i) comparing multiple aggregate risk scores across different vectors of an organization; (ii) one or more of creating a security policy and modifying the security policy using at least one aggregate risk score; (iii) dynamically generating the aggregate risk score when one or more security policies are evaluated; (iv) triggering an alert based on whether at least one aggregate risk score satisfies one or more predefined threshold criteria; and (v) visualizing multiple aggregate risk scores in one or more of geographic regions and sub-networks of the organization.

14. The computer program product of claim 11, wherein the generating the aggregate score for the plurality of individual scores further comprises computing an actual distribution of the plurality of individual scores.

15. The computer program product of claim 11, wherein the plurality of buckets comprises a set of non-overlapping buckets that cover the range of score values, and wherein each of the non-overlapping buckets has a corresponding weight indicating one or more of how much a change in a given bucket contributes to an overall score, relative to other buckets, and whether the given bucket negatively or positively impacts the overall score.

16. An apparatus, comprising:
a memory; and
at least one processing device, coupled to the memory, operative to implement the following steps:
obtaining a plurality of individual scores each indicating a likelihood of an anomaly associated with a corresponding one of a plurality of distinct security events, wherein a given individual score comprises one or more of: a confidence score and a risk score;

obtaining an expected distribution for the plurality of individual scores, over a range of score values, across the plurality of distinct security events, wherein the range of score values is partitioned into a plurality of buckets;

generating, using at least one processing device, an aggregate score that represents the plurality of individual scores, wherein the aggregate score is based at least in part on an aggregation of a ratio, for two or more of the plurality of buckets, of: (i) a count or a percentage of the plurality of individual scores within a given portion of the range, relative to (ii) an expected count or an expected percentage of the plurality of individual scores within the corresponding given portion of the range based on the obtained expected distribution for the plurality of individual scores, wherein the aggregate score provides an indication of a deviation of the plurality of individual scores from the expected distribution; and initiating one or more automated remedial actions based at least in part on the aggregate score.

17. The apparatus of claim 16, wherein the plurality of buckets comprises a set of non-overlapping buckets that cover the range of score values, and wherein each of the non-overlapping buckets has a corresponding expected percentile distribution indicating a percentage of the plurality of individual scores that should fall into each respective bucket.

18. The apparatus of claim 16, wherein the generating the aggregate score for the plurality of individual scores further comprises computing an actual distribution of the plurality of individual scores.

19. The apparatus of claim 16, wherein the aggregate score comprises an aggregate risk score for a plurality of security events, and further comprising one or more steps of: (i) comparing multiple aggregate risk scores across different vectors of an organization; (ii) one or more of creating a security policy and modifying the security policy using at least one aggregate risk score; (iii) dynamically generating the aggregate risk score when one or more security policies are evaluated; (iv) triggering an alert based on whether at least one aggregate risk score satisfies one or more predefined threshold criteria; and (v) visualizing multiple aggregate risk scores in one or more of geographic regions and sub-networks of the organization.

20. The apparatus of claim 16, wherein the plurality of buckets comprises a set of non-overlapping buckets that cover the range of score values, and wherein each of the non-overlapping buckets has a corresponding weight indicating one or more of how much a change in a given bucket contributes to an overall score, relative to other buckets, and whether the given bucket negatively or positively impacts the overall score.

* * * * *